US011311896B2

(12) United States Patent
Drechsel

(10) Patent No.: US 11,311,896 B2
(45) Date of Patent: Apr. 26, 2022

(54) DIFFUSER ASSEMBLY FOR DIFFUSING A LIQUID IN IRRIGATION PLANTS, AND IRRIGATION PLANT COMPRISING A PLURALITY OF DIFFUSER ASSEMBLIES

(71) Applicant: Arno Drechsel, Lienz (AT)

(72) Inventor: Arno Drechsel, Lienz (AT)

(*) Notice: Subject to any disclaimer, the term of this patent is extended or adjusted under 35 U.S.C. 154(b) by 0 days.

(21) Appl. No.: 16/346,096

(22) PCT Filed: Nov. 8, 2017

(86) PCT No.: PCT/IB2017/056979
§ 371 (c)(1),
(2) Date: Apr. 29, 2019

(87) PCT Pub. No.: WO2018/087669
PCT Pub. Date: May 17, 2018

(65) Prior Publication Data
US 2019/0255543 A1 Aug. 22, 2019

(30) Foreign Application Priority Data
Nov. 8, 2016 (IT) .................. 102016000112451

(51) Int. Cl.
*B05B 3/04* (2006.01)
*B05B 15/658* (2018.01)

(52) U.S. Cl.
CPC .......... *B05B 3/0486* (2013.01); *B05B 15/658* (2018.02)

(58) Field of Classification Search
CPC ....... B05B 3/0486; B05B 15/658; B05B 3/06; B05B 15/65; B05B 3/066; B05B 3/008; F16L 27/11
See application file for complete search history.

(56) References Cited

U.S. PATENT DOCUMENTS

| 3,232,539 A | 2/1966 | Hait |
| 4,314,717 A | 2/1982 | Bjurman |

(Continued)

FOREIGN PATENT DOCUMENTS

| EP | 2315632 | 3/2016 | | |
| FR | 2549571 A1 | * 1/1985 | ............... | F16L 27/11 |
| GB | 1421530 A | * 1/1976 | ............... | F16L 51/025 |

*Primary Examiner* — Steven M Cernoch
(74) *Attorney, Agent, or Firm* — Themis Law

(57) ABSTRACT

A diffuser assembly for diffusing a liquid in irrigation plants has a supply conduit includes a diffuser with a nozzle adapted to direct a jet of liquid along a longitudinal axis, at least one deflector facing the nozzle for radially spraying the jet outwards, and a connection device for ensuring fluid connection of the diffuser to the supply conduit of the plant. The diffuser is mounted onto the irrigation plant with the axis extending in a substantially vertical direction and with the nozzle facing up, and the deflector is configured to rotate about the longitudinal axis, thereby causing oscillations in the assembly. The connection device includes a tubular body with end joints that connect to the diffuse, and the supply conduit and the body is monolithic with the joints and is made of a thermoplastic elastomeric base material. Furthermore, the body has an outer surface with annular folds, which imparts elasticity and damp the oscillations induced by the deflector. A pivot or linear irrigation plant includes a plurality of those diffuser assemblies.

11 Claims, 4 Drawing Sheets

(56) References Cited

U.S. PATENT DOCUMENTS

| | | | | |
|---|---|---|---|---|
| 4,846,510 A | * | 7/1989 | Mikol | F16L 11/111 |
| | | | | 285/226 |
| 5,333,796 A | * | 8/1994 | Purtell | A01G 25/09 |
| | | | | 239/734 |
| 7,070,122 B2 | * | 7/2006 | Burcham | B05B 3/008 |
| | | | | 169/37 |
| 9,625,071 B2 | * | 4/2017 | Melo | F16L 33/2071 |

* cited by examiner

DIFFUSER ASSEMBLY FOR DIFFUSING A LIQUID IN IRRIGATION PLANTS, AND IRRIGATION PLANT COMPRISING A PLURALITY OF DIFFUSER ASSEMBLIES

FIELD OF THE INVENTION

The present invention generally finds application in the field of irrigation plants for agricultural use, and particularly relates to a diffuser assembly for diffusing a liquid in irrigation plants.

According to a further aspect, the invention relates to a pivot or linear irrigation plant comprising a plurality of the aforementioned diffuser assemblies.

BACKGROUND ART

Pivot or linear irrigation plants for agricultural use are known, which comprise a load-bearing structure moving along a portion of the soil to be irrigated, and a liquid supply conduit connected to a plurality of liquid diffuser assemblies, which are mounted to the load-bearing structure.

Each of the liquid diffuser assemblies comprises a diffuser which is adapted to deflect the liquid jet from the supply conduit radially outwards.

Namely, the diffuser comprises a nozzle which is adapted to direct a liquid jet along a longitudinal axis and at least one deflector facing the nozzle and rotating about the axis for diverting the liquid jet.

Generally, the supply conduit comprises a transverse pipe mounted to the load-bearing structure and the diffusers hang in fluid communication from the transverse pipe via respective vertical pipes.

In this configuration, each diffuser is in such a position that the nozzle is placed above the deflector to direct the jet downwards.

A first drawback of these plants is that diffusers are placed at a short distance from the soil and can only irrigate a small portion thereof.

A further drawback is that the diffusers are exposed to the oscillations caused by the rotation of the deflector as it is hit by the liquid jet. These oscillations may affect uniform liquid jet distribution.

Another drawback is that vertical pipes interfere with the crops being irrigated as the lead-bearing structure moves forward.

In an attempt to at least partially obviate these drawbacks, diffuser assemblies have been developed in which diffusers are connected to the upper portion of the supply conduit in an upturned position, i.e. with the deflector placed above the nozzle.

US2005029364 discloses a liquid diffuser assembly as described above, with the deflector placed above the nozzle for diverting the liquid jet radially downwards.

Furthermore, this diffuser assembly comprises a tubular connection device between the diffuser and the supply conduit, which comprises a central body made of a yielding material.

The device is connected to the diffuser and the supply conduit via respective joints that can be fitted at the ends, and facilitates pressurized liquid jet supply to the nozzle of the diffuser.

A first drawback of this arrangement is that the connection device made of a yielding material cannot damp the oscillations produced in the diffuser by the rotation of the deflector.

A further drawback is that connection devices are likely to be exposed to bending and failure after repeated use.

These drawbacks contribute to an altered uniformity of the liquid jet distributed by the diffuser and may cause removal or failure of parts of the assembly, thereby causing critical inefficiencies of the irrigation plant.

Another drawback is that the joints of the connection devices do not ensure an optimal sealing effect with the passage of the liquid jet and do not provide a stable connection between each diffuser and its respective connection device.

Furthermore, the connection devices cannot control the pressure of the liquid jet from the supply conduit to the diffuser.

U.S. Pat. Nos. 3,232,539 and 2,315,632 disclose liquid diffuser assemblies which comprise a nozzle for directing a liquid flow upwards and downwards respectively, a diffuser with a rotary deflector and a device for the fluid connection of the diffuser to a supply conduit of an irrigation plant.

U.S. Pat. No. 4,314,717 discloses a flexible plastic nipple for connection of a liquid diffuser to a supply conduit of an irrigation plant.

A drawback of the above discusses prior art arrangements is that the connection devices and the nipple do not ensure stable support of the diffuser in the vertical position, and are likely to bend during operation of the diffuser.

TECHNICAL PROBLEM

In view of the prior art, the technical problem addressed by the present invention may be deemed to consist in providing diffuser assembly for diffusing a liquid in irrigation plants having reduced oscillations and high stability.

DISCLOSURE OF THE INVENTION

The object of the present invention is to solve the above mentioned technical problem and obviate the above discussed drawbacks, by providing an liquid diffuser assembly of oscillating type for irrigation plants, that is highly efficient and relatively cost-effective.

A particular object of the present invention is to provide a liquid diffuser assembly as described above, that can irrigate a predetermined portion of the soil from bottom to top.

A further object of the present invention is to provide a liquid diffuser assembly for irrigation plants that exhibits reduced oscillations.

Another object of the present invention is to provide a liquid diffuser assembly as described above, that can ensure long-lasting uniform distribution of the liquid jet.

A further object of the present invention is to provide a liquid diffuser assembly as described above, that can ensure a stable connection between the supply conduit and the diffusers.

Yet another object of the present invention is to provide a diffuser assembly as described above, that has low maintenance requirements.

These and other objects, are more clearly explained hereinafter, are fulfilled by a liquid diffuser assembly for irrigation plants having a supply conduit, which comprises at least one diffuser with a nozzle adapted to direct a jet of liquid along a longitudinal axis, and at least one deflector facing the nozzle for radially spraying the jet outwards, and a connection device for ensuring fluid connection of the diffuser to a supply conduit of the irrigation plant.

The diffuser is mounted to the plant with the axis extending in a substantially vertical direction and with the nozzle facing upwards, and the deflector is susceptible of turning about such longitudinal axis thereby causing oscillations in the assembly.

The connection device has a tubular body with end joints for connection to the diffuser and the supply conduit. The body is made monolithic with the joints, is made of a thermoplastic elastomeric base material and has an outer surface with annular folds, which impart elasticity and damp the oscillations induced by the deflector.

In a further aspect, the invention relates to a pivot or linear irrigation plant comprising a plurality of the aforementioned diffuser assemblies.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a liquid diffuser assembly for irrigation plants according to the invention, which is described as a non-limiting example with the help of the annexed drawings, in which.

DETAILED DESCRIPTION OF A PREFERRED EXEMPLARY EMBODIMENT

Particularly referring to the figures, numeral 1 shows and designates a diffuser assembly for distributing a liquid, e.g. water, in irrigation plants 2 having a supply conduit 3.

Figure 1:
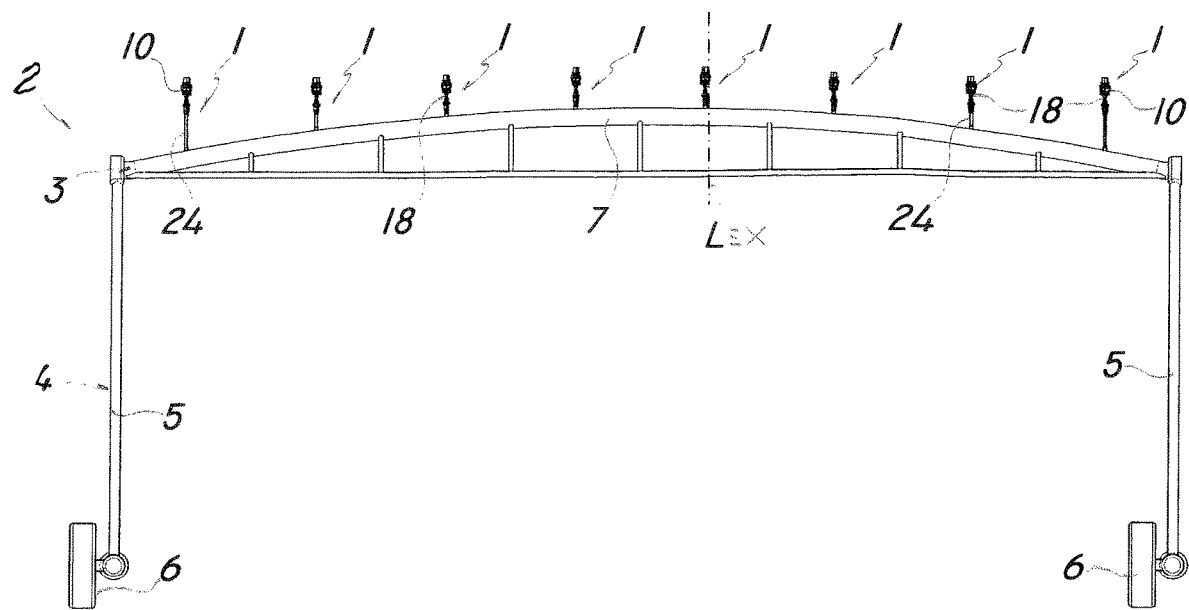
FIG. 1 is a perspective view of an irrigation plant of the invention comprising a plurality of liquid diffuser assemblies.
Figure 2:
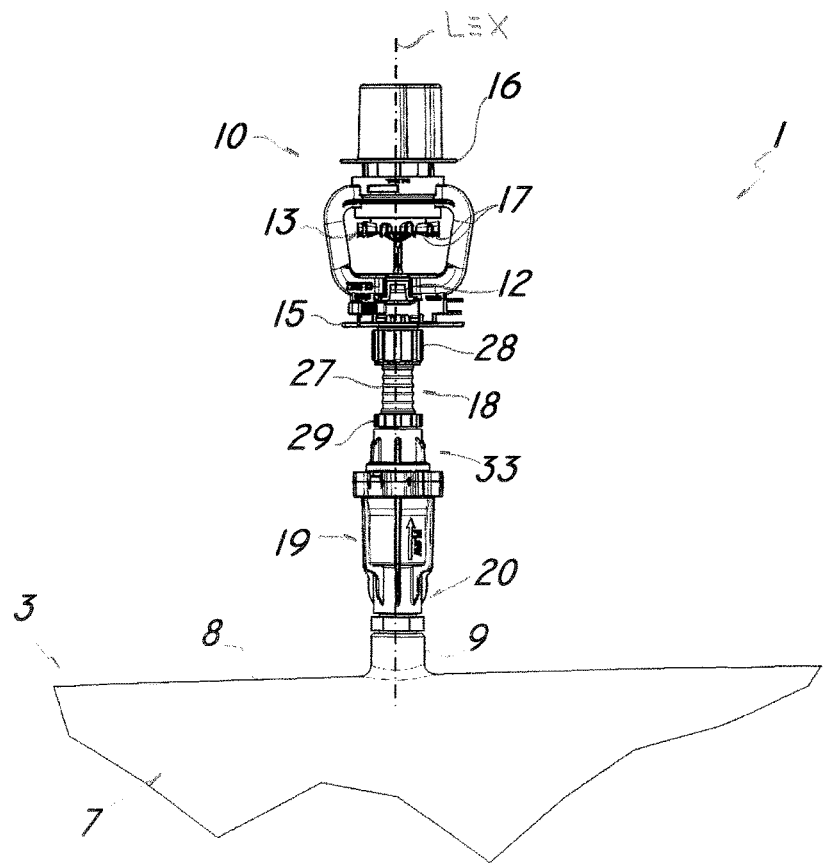
FIG. 2 is an front view of the liquid diffuser assembly of the invention.

The irrigation plant 2 as shown in FIG. 1 may be a pivot or linear irrigation plant and comprises a load-bearing structure 4 with a pair of vertical posts 5 which are adapted to support a substantially horizontal supply conduit 3.

The posts 5 are wheel-mounted 6, for the lead-bearing structure 4 to be able to move along the portion of the soil to be irrigated and the plant 2 comprises a plurality of diffuser assemblies 1 of the invention, connected to the supply conduit 3.

Furthermore, the supply conduit 3 may comprise a pipe 7 with an upper surface 8 formed with a plurality of first openings 9 for connection to respective diffuser assemblies 1.

In a preferred embodiment of the invention, the diffuser assembly 1 comprises a diffuser 10 having a second opening 11 for receiving the liquid jet and a nozzle 12, adapted to direct the jet from the supply conduit 3 upwards along a longitudinal axis L.

Furthermore, the diffuser 10 comprises at least one deflector 13 which faces the nozzle 12 and is designed to radially spray the liquid jet outwards and to rotate about the longitudinal axis L.

The rotation of the deflector 13 is promoted by the pressurized liquid jet emitted by the nozzle 12 and is likely to cause oscillations in the entire assembly 1.

The diffuser 10 may be similar to the one as disclosed in the Italian patent application VI2011A000295, by the proprietor hereof, and the second opening 11 comprises mating outer threads 14 and is secured to a transverse support flange 15.

Nevertheless, in the configuration of the present invention, the diffuser 10 is mounted to the structure 4 of the plant 2 with the axis L extending in a substantially vertical direction and with the nozzle 12 facing up.

Thus, the deflector 13 will be able to radially divert the liquid jet from the nozzle 12 downwards, for uniform irrigation of a portion of the soil.

The diffuser 10 may comprise a frame 16 with a housing portion and the deflector 13 may comprise a rod, not shown, accommodated in the housing portion and adapted to perform a complex rotary motion about the longitudinal axis L.

In addition, the surface of the deflector 13 that faces the nozzle 12 comprises a plurality of curved angular portions 17 for diverting the liquid jet from the nozzle 12.

Figure 5:
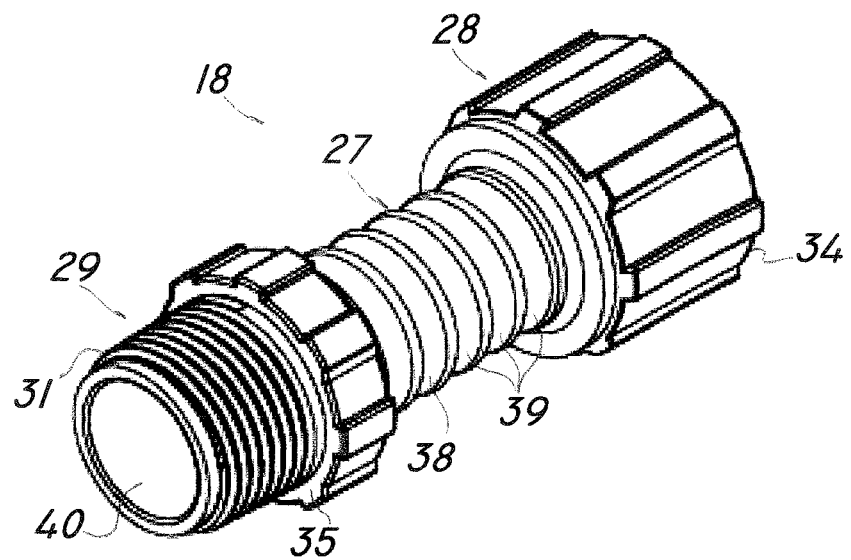
FIGS. 5 to 7 are a perspective view, a broken-away perspective view and a broken-away front view respectively of a first detail of the diffuser assembly of FIG. 2.
Figure 6:
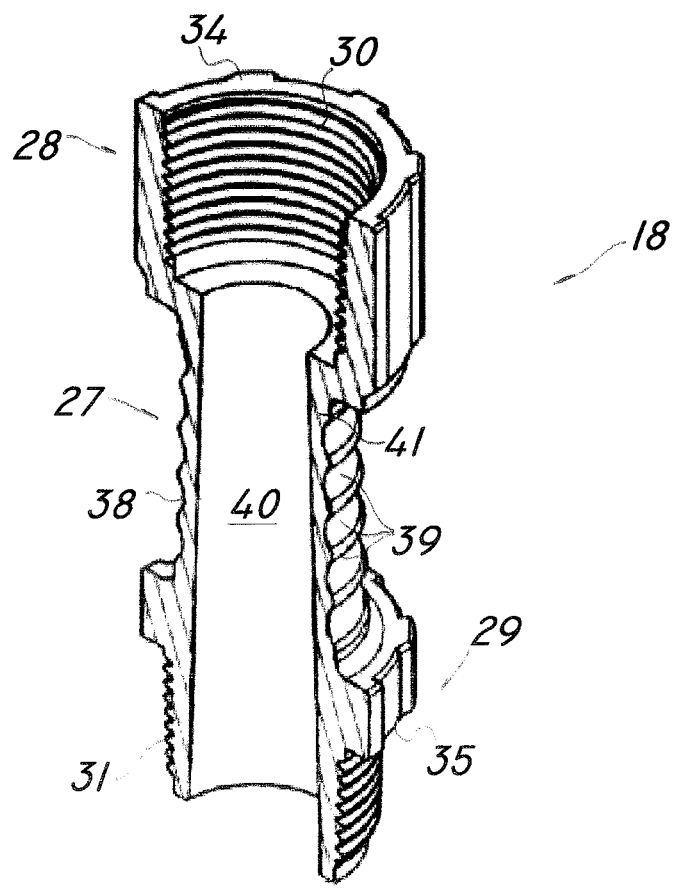
Figure 7:
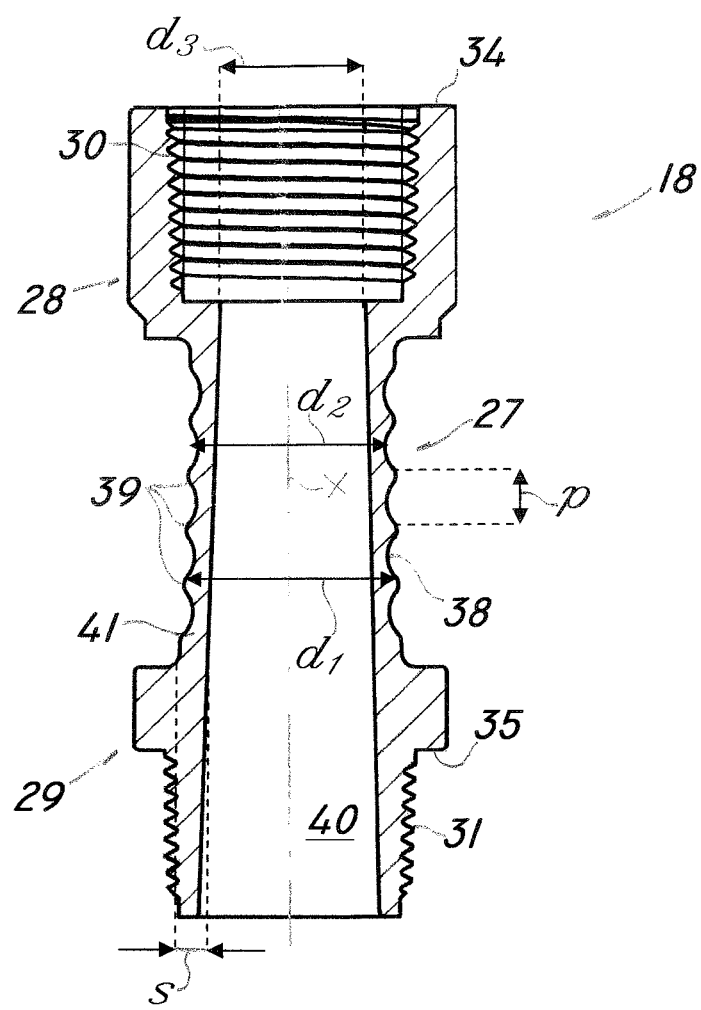

As best shown in FIGS. 5 to 7, the assembly 1 comprises a connection device 18 which is adapted to ensure fluid connection of the diffuser 10 to the supply conduit 3, namely to the first opening 9 formed in the upper surface 8 thereof.

Advantageously, a plurality of connection devices 18 may be provided for connecting respective diffusers 10 of diffuser assemblies 1 to the supply conduit 3, as shown in FIG. 1.

The connection device 18 may be connected to the supply conduit 3 either directly, or with the interposition of a pressure regulator 19, as shown in FIGS. 2 to 5.

The pressure regulator 19 may be substantially similar to the one as disclosed in the Italian patent application 102015000016926 by the proprietor hereof.

Furthermore, in the embodiment that uses the pressure regulator 19, the open end 20 of the latter and the first opening 9 of the supply conduit 3 may comprise respective mating threads 21, 22.

Figure 3:
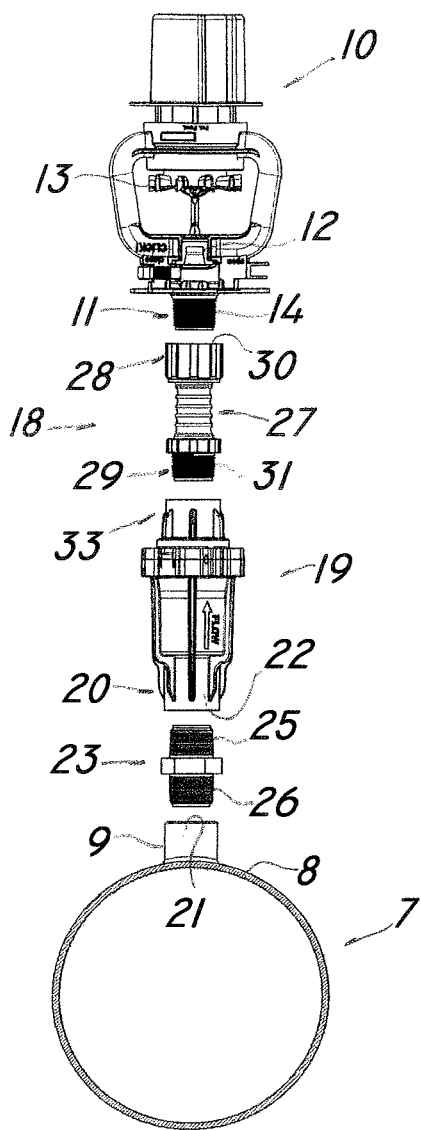
FIG. 3 is an exploded front view of the diffuser assembly of FIG. 2 according to a first embodiment.
Figure 4:
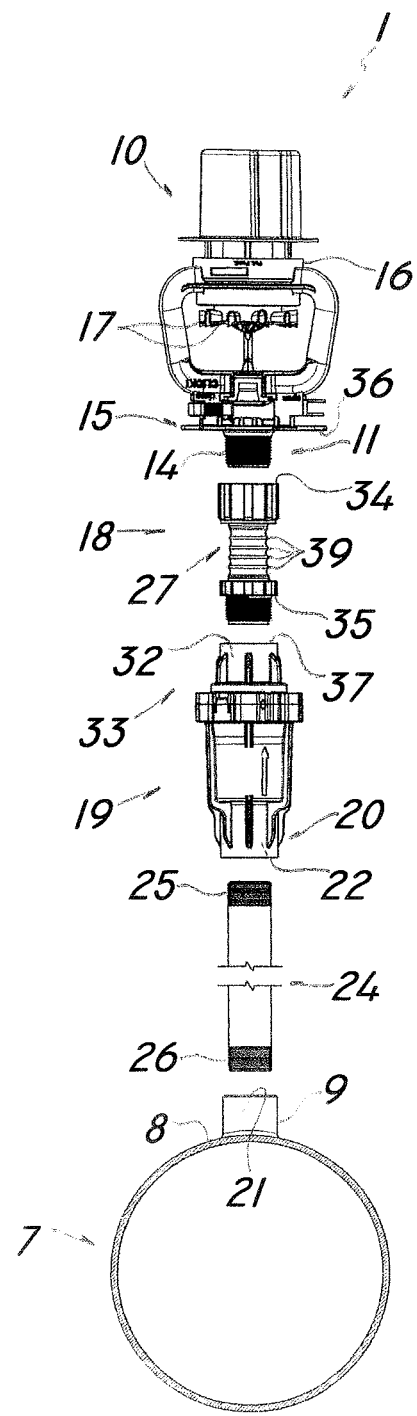
FIG. 4 is an exploded front view of the diffuser assembly of FIG. 2 according to a second embodiment.

An adapter 23, as shown in FIG. 3, or a rigid pipe section 24, as shown in FIG. 4, may be interposed between the pressure regulator 19 and the supply conduit 3.

The adapter 23 and the rigid pipe section 24 may have respective threaded ends 25, 26, which are adapted to be screwed onto the respective mating threads 21, 22 of the first opening 9 and the open end 20.

In the embodiment of the irrigation plant 2 as shown in FIG. 1, the pipe 7 of the supply conduit 3 has an arched shape and all the connection devices 18 of the individual assemblies 1 have the same standard length.

Thus, in order to keep the diffusers 10 at the same height, and ensure consistent soil irrigation, the assemblies 1 may comprise rigid pipe sections 24 of different lengths for connection to the supply conduit 3.

Namely, the rigid pipe sections 24 for connecting the diffuser assemblies 1 at the ends of the pipe 7 may be longer than the pipe sections 24 for the assemblies 1 of the middle portion of the pipe 7.

In a peculiar aspect of the invention, the nozzle 12 is independent of the connection device 18 and is rigidly joined to the diffuser 10, and the connection device 18 comprises a tubular body 27 with a straight axis X and end joints 28, 29 for connection with the diffuser 10 and with the supply conduit 3.

Particularly, the upper end joint 28 connects the device 18 to the diffuser, whereas the lower end joint 29 connects the device 18 to the supply conduit 3. Furthermore, the upper end joint 28 is spaced apart from and longitudinally offset to the nozzle 12 of the diffuser 10.

The joints 28, 29 are formed monolithic with the body 27 and the device 18 is made of a thermoplastic elastomeric base material. This feature imparts elasticity to the tubular body 27 such that the connection device 18 will be able to damp any oscillations produced in the assembly 1 by the rotation of the deflector 13.

Furthermore, this configuration will allow the diffuser 10 to be kept in a substantially vertical position simply by the connection device 18, during operation.

Thus, as the diffuser operates, the longitudinal direction L of the liquid jet and the rectilinear axis X of the tubular body 27 of the connection device 18 are maintained substantially coincident.

The tubular body 27 and the joints 28, 29 may be also formed by a single molding process and from a single base material.

The elastomeric base material may be a thermoplastic elastomer, e.g. a polyurethane having a hardness ranging from 48 to 56 Shore D, as measured by a durometer with a frustoconical indentor, complying with ASTM D2240-00.

The end joints 28, 29 may have respective inner and outer threads 30, 31, directly formed in the base material of the device 18, as best shown in FIGS. 5 to 6.

As mentioned above, the joint 29 that faces away from the diffuser 10 may be connected to the supply conduit 3 either directly or with the interposition of the pressure regulator 19.

Particularly, the inner threads 30 can be screwed onto the corresponding mating outer external 14 formed in the second opening 11 of the diffuser 10, whereas the outer threads 31 can be screwed onto the corresponding mating threads 21 of the first opening 9 of the supply conduit 3.

In the illustrated embodiment, in which the pressure regulator 19 is provided, the outer threads 31 of the corresponding joint 29 can be screwed onto the corresponding mating threads 32 of the open end 33 of the regulator 19 facing away from the end connected to the supply conduit 3.

In addition, the joints 28, 29 may comprise respective front annular mating faces 34, 35 which are adapted to abut the surface 36 of the support flange 15 of the second opening 11 of the diffuser 10 and the front surface 37 of the respective open end 33 of the pressure regulator 19.

The base material selected to form the connection device 18 ensures both high elasticity of the tubular body 27 and adequate rigidity of the threads 30, 31 to facilitate engagement with the respective mating threads 14, 21, 32.

According to a further peculiar aspect of the invention the outer surface 38 of the tubular body 27 of the connection device 18 has annular folds 39, as best shown in FIGS. 5 to 7.

The annular folds 39, in combination with the base material selected to form the connection device 18, impart elasticity to the latter, such that the oscillations produced in the diffuser device 1 may be reduced.

The annular folds 39 may be longitudinally offset by a constant pitch p of 5 mm to 8 mm and preferably of 7 mm.

Furthermore, the annular folds 39 may have a maximum diameter $d_1$ and a minimum diameter $d_2$ with differences ranging from 5% to 10% and preferably of 8%.

Of course, these dimensions may be also slightly different, as needed, without departure from the scope of the invention.

The tubular body 27 may have a substantially cylindrical or frustoconical smooth inner surface 40 with a minimum diameter $d_3$ in the proximity of the joint 28 connected to the diffuser 10 ranging from 14 mm to 16 mm.

Also, the minimum thickness s of the wall 41 of tubular body 27 may range from 1.5 mm to 2.5 mm, such that some bending strength may be imparted thereto.

The connection device 18 as shown in FIG. 7 may have a maximum length l of 80 mm to 120 mm and preferably of about 88 mm.

The liquid diffuser assembly and the irrigation plant of the invention are susceptible of a number of changes or variants, within the inventive concept disclosed in the appended claims.

All the details thereof may be replaced by other technically equivalent parts, and the materials may vary depending on different needs, without departure from the scope of the invention.

While the diffuser assembly and the irrigation plant have been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be produced on an industrial scale in factories for manufacturing parts of irrigation plants.

The invention claimed is:

1. A diffuser assembly (1) for diffusing a liquid in an irrigation plant (2) having a supply conduit (3), said assembly (1) comprising:
    a nozzle (12) for directing a liquid jet upwards along a longitudinal axis (L), the nozzle having a vertical longitudinal axis;
    a diffuser (10) adapted to be mounted onto the irrigation plant (2), the diffuser having at least one deflector (13) facing said nozzle (12) for spraying the liquid jet radially outwards;
    a connection device (18) adapted to ensure fluid connection of said diffuser (10) to the supply conduit (3) of the irrigation plant (2);
    wherein said deflector (13) is adapted to rotate about said longitudinal axis (L), thereby causing oscillations of the diffuser assembly (1); and
    wherein said nozzle (12) is independent from said connection device (18) and is rigidly joined to said diffuser (10), said connection device (18) having,
        a tubular body (27) with a rectilinear axis (X),
        an upper end joint (28) adapted to connect to said diffuser (10), and
        a lower end joint (29) adapted to connect to the supply conduit (3),
    said upper end joint (28) being separate and longitudinally spaced apart from said nozzle (12) and said upper and lower end joints (28, 29) being monolithic with said tubular body (27), said diffuser (10) being kept in a substantially vertical upright position only by said connection device (18), said connection device (18) having an outer surface (38) with annular folds (39) and being made of a thermoplastic elastomeric base material,
    wherein said annular folds (39) are defined an entire length of said tubular body (27) and are longitudinally offset by a constant pitch, and
    wherein said annular folds (39) on said outer surface (38) of said tubular body (27) define a minimum diameter ($d_2$) and a maximum diameter ($d_1$) of said outer surface which are both smaller than an outer diameter of said upper and lower end joints (28, 29), wherein said tubular body (27) has a wall (41) with a minimum thickness ranging from 1.5 mm to 2.5 mm, and wherein a combination of said annular folds (39) and of the thermoplastic elastomeric base material, from which said connection device (18) is made, provides providing said connection device (18) with elasticity that reduces the oscillations produced in said diffuser (10) while also providing a bending strength to said tubular body (27).

2. The assembly as claimed in claim 1, wherein said pitch (p) ranges from 5 mm to 8 mm.

3. The assembly as claimed in claim 1, wherein said minimum diameter ($d_1$) and said maximum diameter ($d_2$) of said annular folds have differences ranging from 5% to 10%.

4. The assembly as claimed in claim 1, wherein said tubular body (27) has a cylindrical or frustoconical inner surface (40) with a minimum diameter ($D_3$) near the upper end joint (28) for connection with said diffuser (10) ranging from 14 mm to 16 mm.

5. The assembly as claimed in claim 1, wherein said tubular body (27) is formed with said upper and lower end joints (28, 29) by a single molding process.

6. The assembly as claimed in claim 1, wherein said upper and lower end joints (28, 29) have inner threads (30) and outer threads (31) respectively, which are directly formed in the base material of the connection device (18), said inner threads being defined within a cylindrical end having ridges protruding from an outer surface thereof.

7. The assembly as claimed in claim 1, wherein said connection device (18) has a maximum length (I) ranging from 80 mm to 120 mm.

8. The assembly as claimed in claim 1, wherein said thermoplastic elastomeric base material is a thermoplastic elastomer whose hardness ranges from 48 to 56 Shore D.

9. The assembly as claimed in claim 1, wherein the lower end joint (29) faces away from the diffuser (10).

10. The assembly as claimed in claim 1, wherein the lower end joint (29) faces away from the diffuser (10) and is designed for connection with interposition of a pressure regulator (19).

11. A pivot or linear irrigation plant (2), comprising:

a horizontal supply conduit (3); and a plurality of diffuser assemblies (1) having irrigation nozzles (12) in fluid connection with said supply conduit (3) with longitudinal axes (L) of said nozzles (12) extending in a vertical direction;

wherein said diffuser assemblies (1) have connection devices (18) for connecting diffusers (10) to the supply conduit (3) as claimed in claim 1.

* * * * *